United States Patent Office 3,547,778
Patented Dec. 15, 1970

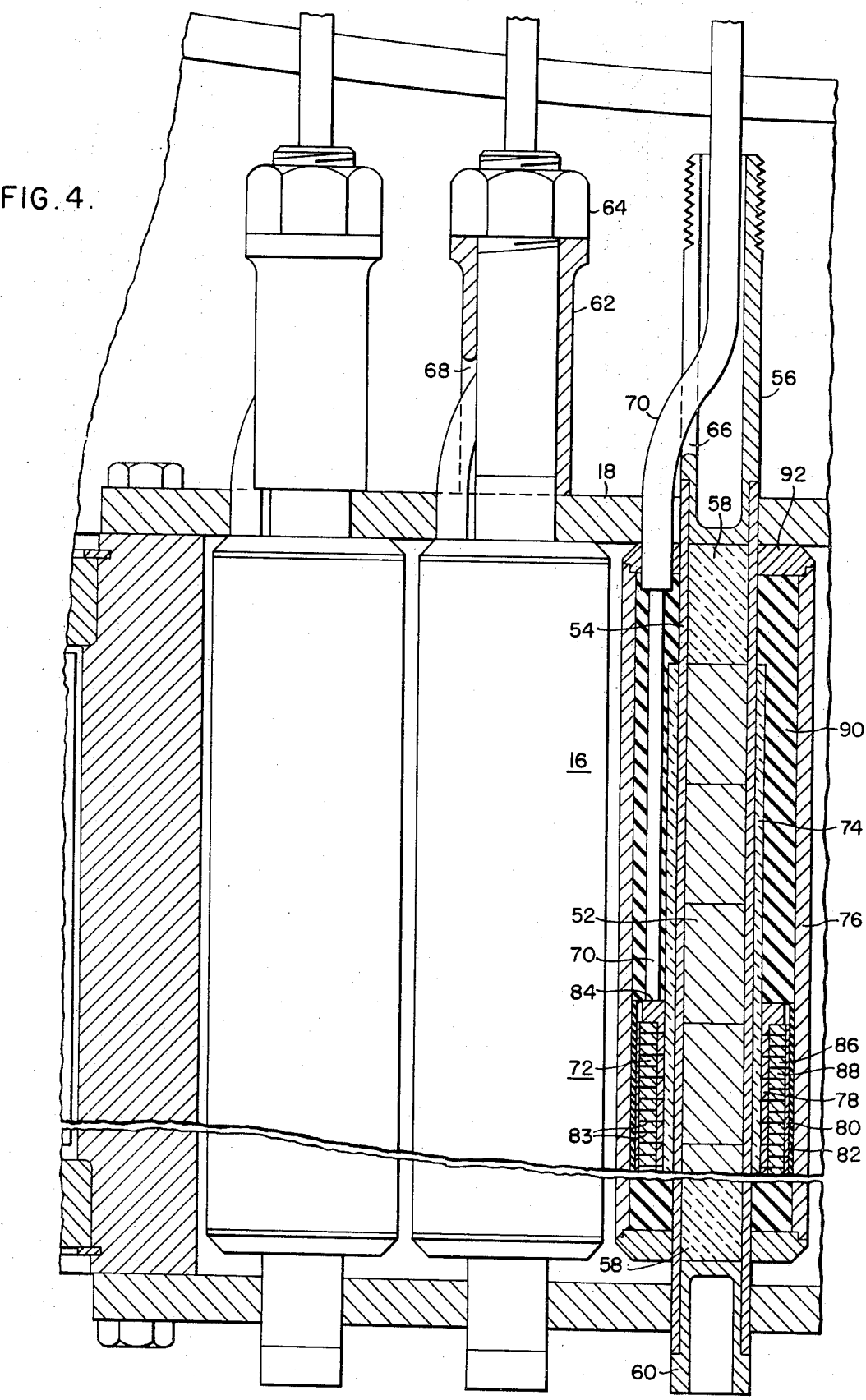

3,547,778
SUBMERSIBLE NUCLEAR REACTOR PLANT
Robert Flaherty, Pittsburgh, and David G. Ott, Bridgeville, Pa., assignors to Westinghouse Electric Corporation, Pittsburgh, Pa., a corporation of Pennsylvania
Filed July 24, 1967, Ser. No. 655,364
Int. Cl. G21c 15/00
U.S. Cl. 176—53   11 Claims

ABSTRACT OF THE DISCLOSURE

A thermoelectric nuclear power plant suitable for underseas operation includes a nuclear reactor, the fuel elements of which are metal-clad ceramic nuclear fuel rods surrounded by tubular thermoelectric generating devices. The reactor core consists of cylindrical fuel assemblies clamped to a plate at their upper ends and separated and guided by a similar plate at their lower ends. These plates are bolted to the ends of a thick-walled cylindrical barrel which serves both as a neutron reflector and as the main structural member of the reactor which is controlled by the rotation of cylindrical drums mounted with their axes parallel to the axis of the core. Rotation of the drums replaces a neutron-reflecting material close to the core with a neutron absorber. The primary coolant of the reactor is de-ionized water which convectively cools the outer surfaces of the fuel assemblies, and transfers this heat to the sea through the tube walls of a heat exchanger which surrounds and is supported by the reflector barrel. The water is circulated by a submersible motor driven propeller-type pump.

BACKGROUND OF THE INVENTION

This invention relates, generally, to systems for converting heat directly into electricity and more particularly, to thermoelectric nuclear power plants suitable for underseas operation.

Relatively recent economic, political, and technical developments have directed attention to the continental shelves, slopes, and the deep ocean bottom as well as the vast quantity of water above them, as possible sources of food, mineral resources, and unidentified technological opportunities, as well as secure bases for military operation. A common feature of efforts to exploit the oceans for any of the foregoing purposes is the need for power supplies independent of the atmosphere to provide power for propulsion, life support, and underwater operations.

An object of this invention is to provide a power supply for underwater operations which combines high specific energy storage with controllable and potentially high power level.

Another object of the invention is to provide a thermoelectric nuclear power plant capable of operating at relatively great depths under water.

A further object of the invention is to provide for utilizing sea water as a coolant for a thermoelectric nuclear power plant.

Other objects of the invention will be explained fully hereinafter or will be apparent to those skilled in the art.

SUMMARY OF THE INVENTION

In accordance with one embodiment of the invention, a reactor core comprises a plurality of cylindrical assemblies clamped to a support plate at their upper ends and separated and guided, but not restrained axially by a guide plate at their lower ends. Both of these plates are bolted to the ends of a thick-walled cylindrical barrel which serves both as a neutron reflector and as the main structural member of the reactor which is controlled by rotatable cylindrical drums mounted with their axes parallel to the axis of the core. Each fuel assembly includes solid cylinders of nuclear fuel stacked in a metal tube, closed at both ends by welded end plugs, and surrounded by thermoelectric generating devices. The primary coolant of the reactor is de-ionized water which convectively cools the outer surfaces of the fuel assemblies and transfers this heat to the sea through the tube walls of a heat exchanger which surrounds the reflector barrel. The water is circulated by a submersible motor driven pump. A bubble cap permits gas formed by decomposition of the coolant water to escape to the sea and sea water admitted to the reactor to compensate for gas evolution and density changes is filtered and de-ionized by passing through a long packed bed containing both anion and cation exchange resins. The resin bed is contained in an annular pipe wrapped around the reactor foundation or base.

BRIEF DESCRIPTION OF THE DRAWINGS

For a better understanding of the nature and objects of the invention, reference may be had to the following detailed description, taken in conjunction with the accompanying drawings in which:

FIG. 4 is an enlarged detail view showing a portion of one of the fuel assemblies of the reactor.

DESCRIPTION OF THE PREFERRED EMBODIMENTS

Figure 1:
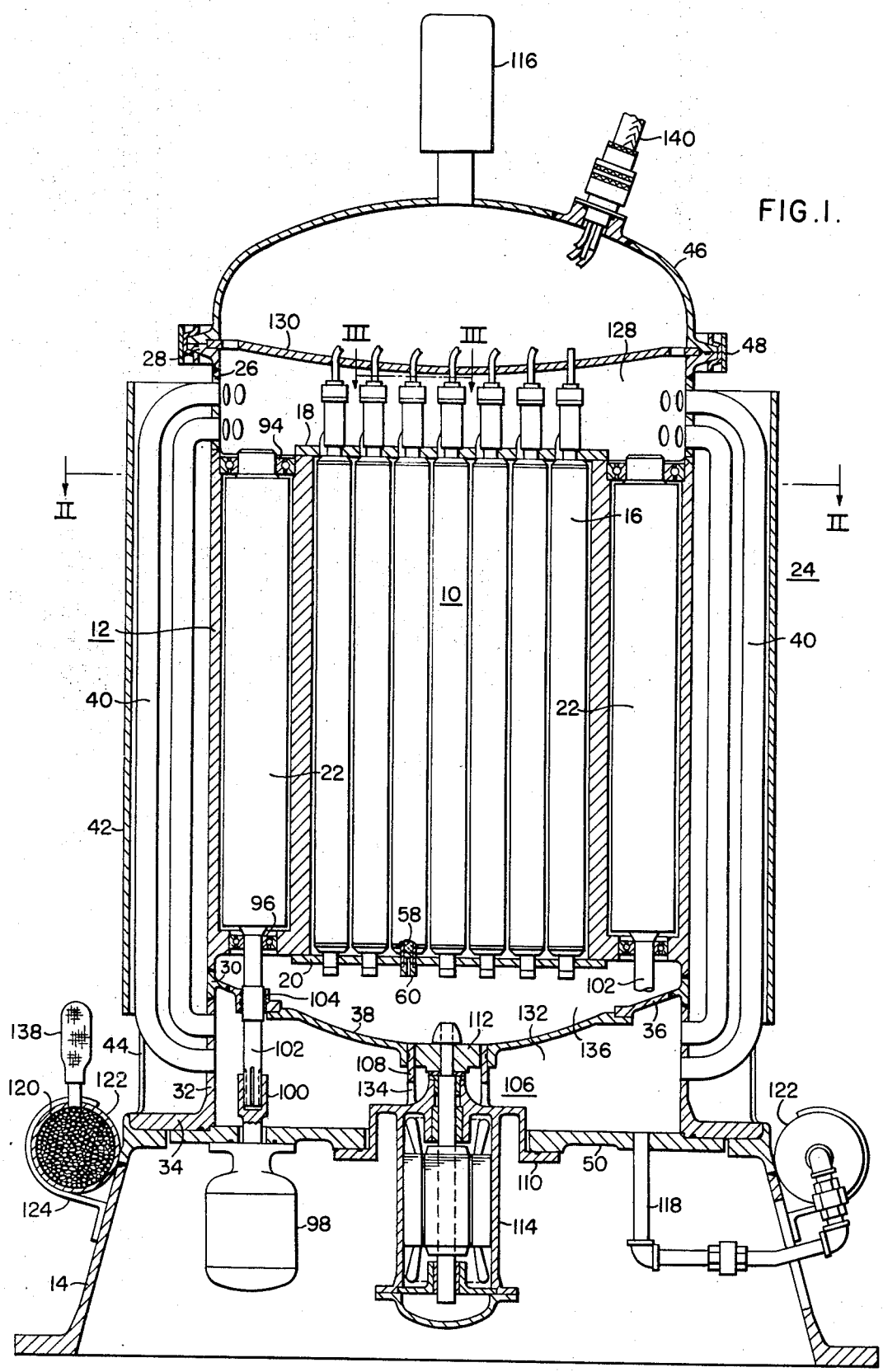
FIG. 1 is a view, in longitudinal section, of a thermoelectric nuclear power plant embodying principal features of the invention.
Figure 2:
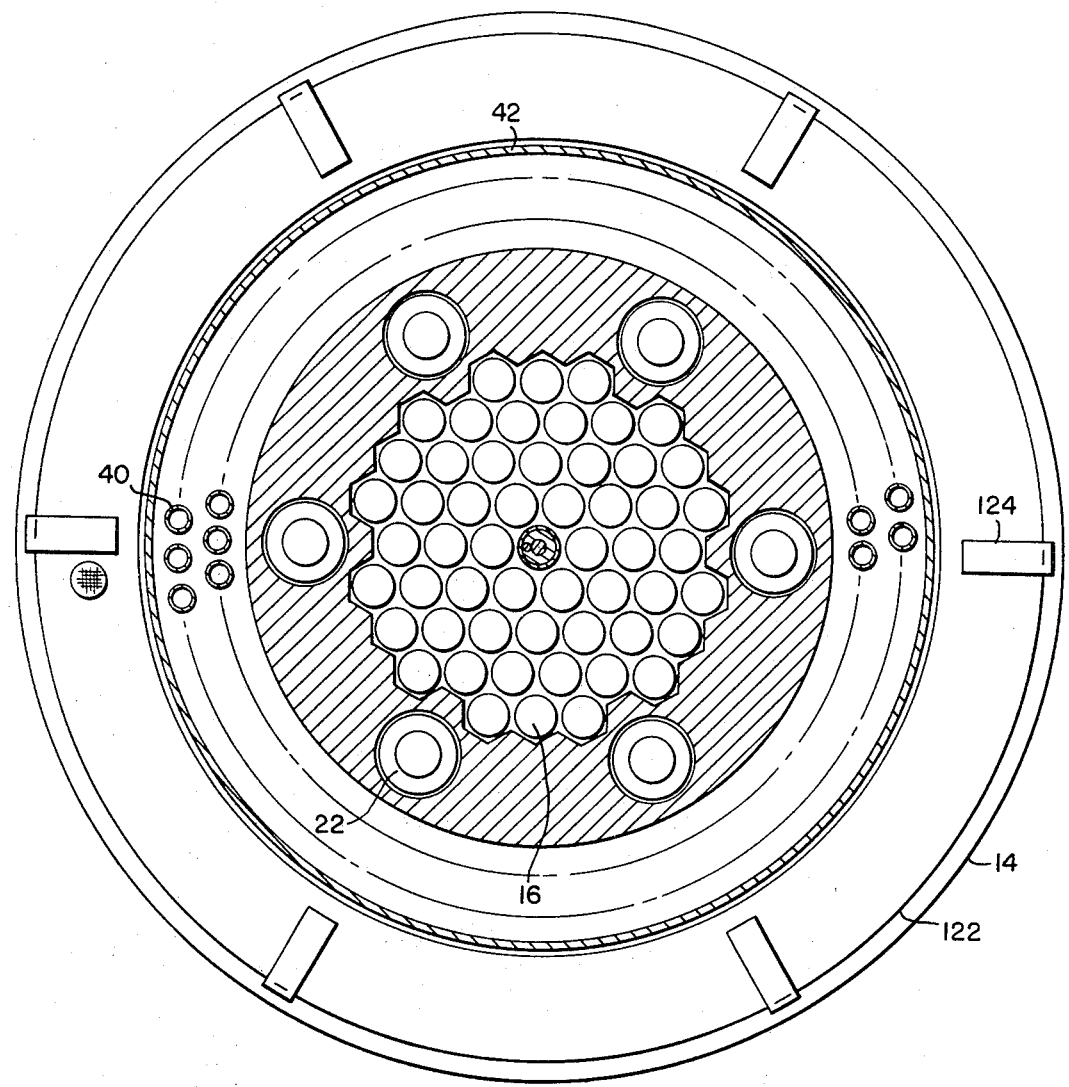
FIG. 2 is a view, in section, taken along the line II—II in FIG. 1.

Referring to the drawing, and particularly to FIG. 1, the reactor structure shown therein comprises a core 10 disposed inside a relatively thick-walled nickel generally cylindrical barrel 12 which serves both as a neutron reflector and as the main structural member of the reactor. The barrel 12 is supported by a hollow metal base 14 which may be of a conical frustum shape. The core 10 consists of a plurality of generally cylindrical fuel assemblies 16, located in a hexagonal array as shown more clearly in FIG. 2. The assemblies 16 are clamped to a support plate 18 at their upper end and separated and guided, but not restrained axially, by a guide plate 20 at their lower ends. Both of these plates are bolted to the ends of the barrel 12.

The reflector barrel 12 constrains and supports the core 10, a plurality of generally cylindrical control drums 22, a primary coolant heat exchanger 24, and serves as a barrier between the primary coolant stream in the core and the ambient sea or other body of water in which the reactor is installed. By way of example, the basic piece may be a forged ring 24 inches long 21½ inches OD, and having a wall about 5 inches thick with 6 axial holes bored around the wall to house the control drums 22. To the upper end of this forging is welded a rolled plate cylinder 26 followed by a flange 28. To the lower end is welded a Y-ring 30, followed by a rolled plate cylinder 32 and a flange 34. A support ring 36 is welded to a branch of the Y-ring 30 and a diaphragm 38 is bolted to the support ring 36. The diaphragm 38 is part of a baffle system which channels coolant flow inside the reactor.

The relatively thin cylinders 26 and 32 are each drilled radially in a plurality of places for insertion of the ends of shallow U-tubes 40 of the heat exchanger 24. A cylindrical metal shield 42 surrounds the heat exchanger tubes 40. The shield 42 is a continuation of the base 14. Penetrations 44 through the shield 42 admit sea water to the primary coolant sea water heat exchanger 24. The ends of the tubes 40 are welded into the rolled plate cylinders 26 and 32 which function as tube sheets for the primary coolant seat water heat exchanger 24. Following all the welding, the contoured cavity for the core and the bores for the control drums and their bearings are finish machined. A top cover member 46 may be clamped to the upper flange 28 by clamping means 48. A bottom cover member 50 may be bolted to the lower flange 34 which may also be bolted to the base 14—shield 42 weldment.

As shown more clearly in FIG. 4, the fuel elements 52 for the fuel assemblies 16 consist of solid cylinders of sintered enriched uranium dioxide ($UO_2$) which are stacked in a metal tube composed of a high temperature nickel base alloy, such as Hastelloy. The upper end of the tube 54 is closed by a cylindrical metal plug 56 having a closed bottom end. A quantity of zirconia, or other thermal insulation material 58 is provided between the upper fuel element 52 and the plug 56. As shown in FIG. 1, the lower end of each tube 54 is closed by a metal plug 60 which functions as a guide member for the fuel assembly 16 in the guide plate 20. Thermal insulation 58 is provided between the lower fuel element 52 and the plug 60.

Each fuel assembly 16 is supported by the cylindrical plug 56 which extends through the support plate 18 with a metal sleeve 62 fitting over the plug 56. A nut 64 is threaded onto the upper end of the plug 56 to tighten the sleeve 62 against the support plate 18, thereby supporting the fuel assembly 16. Aligned slots 66 and 68 are provided in the cylindrical plug 56 and the sleeve 62, respectively, to permit a conductor or conductors 70, which extend through the support plate 18 from the fuel assembly 16, to enter the cylindrical plug 56 and come out the top of the plug.

The metal tube 54 serves also as the inner cladding of a seven layer tubular thermoelectric device 72 which surrounds the central or intermediate portion of the fuel elements 52. The thermoelectric device or generator 72 may be generally of the type fully described in Pat. 3,117,913, issued Jan. 14, 1964 to W. E. Shoupp and assigned to the Westinghouse Electric Corporation. As shown in FIG. 4, a relatively thick insulating sleeve 74 surrounds the metal sleeve 54 and is coextensive with the fuel elements 52. The sleeve 74 is composed of pyrolytic boron nitride rather than sintered boron nitride. The anisotropic thermal conductivity of this material, approximately 40 times as great axially as radially, causes this sleeve to act as a "heat pipe" transferring heat axially from the axially centered nuclear power peak and from the overhanging insulated fuel at the ends of the assembly ot approximate uniform radial heat flux over the length of the thermoelectric material.

The thermoelectric generator 72 is enclosed inside a metal tube 76 which extends at least the length of the stacked fuel elements 52. The tube 76 may be composed of a corrosion resistant material, such as stainless steel. As described the aforesaid patent, the thermoelectric device 72 includes a plurality of inner and relatively smaller casing sections or cylinders 78 which surround the nitride sleeve 74 and are spaced longitudinally and coaxially along the central or intermediate portion of the stacked fuel elements 52. A plurality of outer and larger diameter casing sections or cylinders 80, spatially removed from the inner cylinder 78, are similarly spaced longitudinally and coaxially along the intermediate portion of the fuel elements 52. The outer cylinders 80 are arranged to overlie individually the gap between the inner cylinders 78 and additionally to overlie desirably equal portions of the pairs of the inner cylinders which are respectively adjacent the gaps between the inner cylinders.

Between each pair of adjacent, spacedly overlapping portions of the inner and outer cylinders 78 and 80, respectively, are disposed in an alternating array, a pair of intermediate cylinders 86 and 88. The intermediate cylinders 86 and 88 are fabricated from a suitable pair of dissimilar thermocouple materials. By way of example, the intermediate cylinders 86 may each be fabricated from an ion sulfide which is at least preponderately ferric sulfide ($Fe_2S_3$). The cylinders 88 are fabricated from a complementary thermocouple material comprising an iron sulfide which is at least preponderately ferrous sulfide (FeS). A thin sleeve of boron nitride 82 is provided between the cylinders 80 and the metal tube 76. Mica insulations 83 may be provided betwen cylinders 78, 80, 86 and 88. Thus, a thermopile is provided with the inner cylinders 78 connecting the hot junctions of the dissimilar thermocouple element, represented by the intermediate cylinders 86 and 88, and with the outer cylinders 80 connecting the cold junctions of the thermocouple elements. With this arrangement, the dissimilar thermoelectric materials comprising intermediate cylinders 86 and 88 are coupled in electrical series along the length of the thermoelectric device or generator 72.

In order that both electrical leads may emerge at the same end of the thermoelectric device 72, it may be divided radially into two stacks by cutting the members 78, 80, 86 and 88 in half, with the exception of the bottom end members, and separating the halves with a suitable insulation, such as mica. Thus, an electrical conductor 70 may be connected to each stack, as at 84, the two stacks being in series electrically. The conductors 70 extend through an opening provided in an insulating sleeve 90 which extends from the top of the thermoelectric device 72 to the top of the outer metal tube 76 which is closed by an end cap 92 secured in the upper end of the tube 76.

The reactor is controlled by modification of the neutron reflecting properties of the nickel reflector barrel 12. Mechanically, this modification consists of rotation of the drums 22 mounted with their axes parallel to that of the core. The drums 22 are rotatably supported in an upper bearing assembly 94 and a lower bearing assembly 96. The drums 22 are so constructed that by rotation they replace a neutron reflecting material such as nickel close to the core with a neutron absorber such as hafnium (or with a moderator such as beryllium, if the core itself contains a large fraction of thermal neutron absorbers and operates at the fast end of the neutron energy spectrum). The drums are positioned individually by stepping motors which may be of a solid rotor salient pole reluctance type with flooded stator windings. As shown in FIG. 1, the motors 98 are mounted on the bottom cover plate 50 inside the base 14. Each motor is connected to a drum 22 by means of a spined coupling 100 and a shaft 102 which extends through a labyrinth seal 104 in the support ring 36.

The primary coolant of the reactor is de-ionized water which convectively cools the outer surfaces of the fuel assembly 16 (the cold junctions of the thermoelectrical devices) and transfers this heat to the sea through the tube walls of the heat exchanger 24. The flow rate necessary to do this is provided by an axial flow propeller type pump 106 mounted on the bottom end cover 50. The pump assembly comprises a housing 108, which projects through the baffle 38, a mounting flange 110, an impeller 112, which is mounted directly on the motor shaft, and a submersible induction motor 114. Because the thermoelectric output is direct current, a DC-AC converter is necessary to provide alternating current for this motor. However a converter is almost certainly necessary for other electrical system loads.

The cooling system is not controllably pressurized, but is connected directly to the ambient sea in two ways. At the top of the reactor a vent or bubble cap 116 is installed to permit gas formed by radiolytic decomposition of coolant water to escape to the sea. At the bottom of of reactor is a continuous fluid connection through pipe means 118 and a long packed bed 120 containing both anion and cation exchange resins. In this way sea water admitted to the reactor to compensate for gas evolution and density changes is both filtered and de-ionized. For convenience, the resin bed 120 is contained in an annular pipe 122 wrapped around the base 14 of the reactor. The pipe 122 is supported by brackets 124 attached to the base 14.

Figure 3:
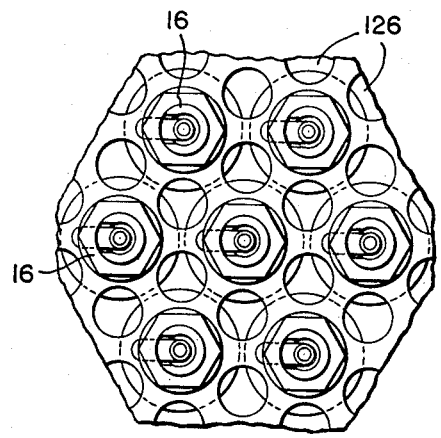
FIG. 3 is a view taken along the line III—III in FIG. 1.

The de-ionized water is circulated by the pump 106 through openings 126 in the guide plate 20 and the support plate 18, see FIG. 3, thereby flowing around and between the fuel assemblies 16 into a chamber 128 between the support plate 18 and a baffle 130. The water flows downwardly from the chamber 128 through the tubes 40 of the heat exchanger 24 into a chamber 132 between the baffle 38 and the bottom cover 50. The water is drawn from the chamber 132 by the impeller 112 through openings 134 in the pump housing 108 and flows into a chamber 136 between the baffle 38 and the guide plate 20 from which it is circulated in the manner previously described. The sea water enters the de-ionizing bed 120 through a screen 138 attached to the annular pipe 122.

Assembly of the reactor presents no unusual problems. Once the reflector shell 12 is finish machined, the bottom guide plate 20 is installed and the shell or barrel 12 is positioned bottom end down. The control drums 22 are installed in the shutdown position and the fuel assemblies 16 are fitted into the barrel. When all the fuel assemblies are in place, the support plate 18 is fitted over them and attached to the reflector barrel. Next the slotted sleeves 62 and clamp nuts 64 are installed on each assembly, leaving the electrical leads projecting upwardly. The dished baffle plate 130 is then lowered over the electrical leads which are then interconnected in desired series-parallel combinations as determined from critical assembly flux maps. The interconnected leads are connected to an output cable 140 which extends through the top cover 46, and potted in an insulating compound, such as an epoxy resin. Installation of the top cover 46 is the final operation with the reactor in this position. The reactor is then inverted, the bottom cover 50 is put on, and the drum drive motors 98 and the pump assembly 106 installed and their electrical harnesses fitted and potted. The completed reactor plant may then be covered by the shield 42 and attached to the base 14.

Refueling of the reactor probably would not be required during the life of the ship or sea hut. Because of the small size of the complete plant it could be readily removed and replaced, the spent unit being disassembled and refurbished at leisure in a hot cell or some other shore facility. This procedure is particularly attractive for deep water vehicles and installations because it would permit almost uninterrupted use of the undersea facility. Should maintenance of the drum drive motors or pump be necessary, these components can be readily removed and replaced, even under water. A work space sealed off from the sea and flooded with de-ionized water would be required to prevent entrance of sea water into the coolant system.

From the foregoing description it is apparent that the invention provides a thermoelectric nuclear power plant suitable for underwater operation. A single shell or barrel is utilized as support for the primary heat exchanger (core), the secondary heat exchanger, the control system, and as both neutron reflector and primary system boundary. A pressure balancing system is provided between two zones of a continuous water-filled space by connection through a porous bed which both reduces flow and filters and modifies the composition of the liquid percolating through it. The use of a boron nitride "heat pipe" reduces the axial variation and temperature resulting from the axial variation in neutron flux in the reactor.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

We claim as our invention:

1. A nuclear power plant for ambient underwater operation comprising a generally cylindrical barrel, means enclosing the ends of said barrel, a plurality of generally cylindrical nuclear fuel assemblies mounted within the barrel, reactor control means disposed adjacent at least some of the fuel assemblies, heat exchanging means surrounding the outside of the barrel, conduit means communicatively coupled to the ambient for admitting water into the barrel from surrounding ambient water, means for de-ionizing said admitted water, means for circulating said de-ionized water through the barrel and the heat exchanging means, and vent means coupled to said barrel for releasing gas formed by decomposition of the coolant water from the barrel.

2. The power plant defined in claim 1 including a hollow base for supporting the barrel.

3. The power plant defined in claim 2 wherein the conduit means comprises an annular pipe wrapped around the base and includes anion and cation exchange resins contained therein.

4. The power plant defined in claim 2 wherein the circulating means is mounted within the base.

5. The power plant defined in claim 1 wherein the control means includes cylindrical drums rotatably mounted in the barrel with their axes parallel to the axis of the fuel assemblies.

6. The power plant defined in claim 5, including motors for positioning the drums step-by-step.

7. A thermoelectric nuclear power plant comprising a generally cylindrical barrel having a relatively thick side wall with cylindrical bores spaced around the wall, cylindrical control drums rotatably mounted in the bores, a plurality of generally cylindrical thermoelectric nuclear fuel assemblies mounted within the barrel, a coolant in said barrel, cylindrical extensions secured to the top and the bottom of the barrel with a plurality of openings in the extensions, top and bottom covers attached to the extensions, U-shaped tubes disposed around the outside of the barrel with their ends secured in said openings, and means for circulating said coolant around the fuel assemblies and through the tubes.

8. The power plant defined in claim 7 wherein the circulating means includes a motor driven pump and baffles disposed between the ends of the fuel assemblies and the top and bottom covers to direct the flow of coolant.

9. The power plant defined in claim 7 wherein each fuel assembly comprises a plurality of fuel elements disposed inside an inner metal tube, a relatively thick inner sleeve of boron nitride surrounding the tube coextensively with the fuel elements, thermoelectric generating devices surrounding only an intermediate portion of the boron nitride sleeve, a relatively thin outer sleeve of boron nitride surrounding the devices, and an outer metal tube surrounding the outer sleeve of boron nitride and extending at least the length of the fuel elements.

10. The power plant defined in claim 9 including a support plate attached to the upper end of the barrel, a cylindrical metal plug having a closed bottom end secured in the upper end of the inner metal tube of each fuel assembly and extending above the support plate, a slot in the wall of the cylindrical plug, a metal sleeve fitting over the plug and having a slot therein aligning with the slot in the plug, a nut threaded onto the upper end of the plug to tighten the lower end of the metal sleeve against the support plate to support the fuel assembly, and a conductor extending from the fuel assembly through the support plate and the slots into the cylindrical plug and out the upper end of the plug.

11. The reactor power plant of claim 1 including thermoelectric means having at least two spaced surfaces, one of said surfaces positioned in heat transfer relation with the fuel of one of said fuel assemblies and the other in spaced relation with said last mentioned fuel.

References Cited

UNITED STATES PATENTS

| | | | |
|---|---|---|---|
| 2,861,034 | 11/1958 | Wigner et al. | 176—64 |
| 3,114,414 | 12/1963 | Judd | 176—65 |
| 3,117,913 | 1/1964 | Shoupp | 176—39 |
| 3,118,818 | 1/1964 | Bray | 176—65 |
| 3,155,547 | 11/1964 | Siebker | 176—39 |
| 3,164,525 | 1/1965 | Wetch et al. | 176—33 |
| 3,201,619 | 8/1965 | Gleason et al. | 176—39 |
| 3,245,879 | 4/1966 | Purdy et al. | 176—61 |
| 3,259,766 | 7/1966 | Beckjord et al. | 176—39 |
| 3,284,311 | 11/1966 | McHugh | 176—65 |

BENJAMIN R. PADGETT, Primary Examiner

H. E. BEHREND, Assistant Examiner

U.S. Cl. X.R.

176—39, 65, 33; 136—202